United States Patent
Yang et al.

(10) Patent No.: US 12,551,875 B2
(45) Date of Patent: Feb. 17, 2026

(54) PREPARATION METHOD OF EFFICIENT AND STABLE CATALYTIC MEMBRANE BASED ON MULTI-SCALE HOLLOW MOLECULAR SIEVE FIBER

(71) Applicant: Beijing Normal University, Zhuhai, Zhuhai (CN)

(72) Inventors: Yi Yang, Zhuhai (CN); Yuxi Long, Zhuhai (CN); Ruikun Xu, Zhuhai (CN); Haowen Lin, Zhuhai (CN); Chenyang Zheng, Zhuhai (CN); Yinuo Wang, Zhuhai (CN); Huiqi Zhu, Zhuhai (CN); Xuhui Xu, Zhuhai (CN); Lulu Bao, Zhuhai (CN); Minyi Liu, Zhuhai (CN); Xintong You, Zhuhai (CN); Ying Li, Zhuhai (CN)

(73) Assignee: Beijing Normal University, Zhuhai (CN)

( * ) Notice: Subject to any disclaimer, the term of this patent is extended or adjusted under 35 U.S.C. 154(b) by 471 days.

(21) Appl. No.: 18/057,004

(22) Filed: Nov. 18, 2022

(65) Prior Publication Data
US 2023/0321640 A1 Oct. 12, 2023

(51) Int. Cl.
| | |
|---|---|
| *B01J 29/46* | (2006.01) |
| *B01J 35/59* | (2024.01) |
| *B01J 37/00* | (2006.01) |
| *B01J 37/03* | (2006.01) |
| *B01J 37/04* | (2006.01) |
| *B01J 37/08* | (2006.01) |
| *B01J 37/34* | (2006.01) |
| *C01B 39/40* | (2006.01) |

(52) U.S. Cl.
CPC ............. *B01J 29/46* (2013.01); *B01J 35/59* (2024.01); *B01J 37/0018* (2013.01); *B01J 37/009* (2013.01); *B01J 37/038* (2013.01); *B01J 37/04* (2013.01); *B01J 37/08* (2013.01); *B01J 37/342* (2013.01); *B01J 37/343* (2013.01); *C01B 39/40* (2013.01)

(58) Field of Classification Search
CPC ........ B01J 29/46; B01J 35/59; B01J 37/0018; B01J 37/009; B01J 37/038; B01J 37/04; B01J 37/08; B01J 37/342; B01J 37/343; B01J 2229/186; B01J 37/035; C01B 39/40; Y02P 20/52
See application file for complete search history.

(56) References Cited

PUBLICATIONS

Liu et al., "Hierarchical Macro-meso-microporous ZSM-5 Zeolite Hollow Fibers With Highly Efficient Catalytic Cracking Capability" Scientific Reports 4, Dec. 2014, 1-6 (Year: 2014).*
Mintova et al., "Closely Packed Zeolite Nanocrystals Obtained via Transformation of Porous Amorphous Silica" Chem. Mater. 16, Nov. 2004, 5452-5459 (Year: 2004).*
Yang et al., "The preparation of Fe2O3—ZSM—5 catalysts by metal-organic chemical vapour deposition method for catalytic wet peroxide oxidation of m-cresol" R. Soc. open sci. 5, Mar. 2018, 1-15 (Year: 2018).*

* cited by examiner

*Primary Examiner* — Anthony J Zimmer
*Assistant Examiner* — Abdul-Rahman Yusuf Waleed Smari
(74) *Attorney, Agent, or Firm* — Heslin Rothenberg Farley and Mesiti P.C.; Victor A. Cardona, Esq.

(57) ABSTRACT

The present disclosure provides a preparation method of an efficient and stable catalytic membrane based on a multi-scale hollow molecular sieve fiber, and belongs to the technical field of molecular sieve preparation. The preparation method includes the following steps: mixing a silicon source, an aluminum source, water, and an organic template, and stirring; heating, and adding deionized water; conducting a reaction by hydrothermal synthesis; conducting centrifugation on an obtained suspension, loading by mixing an obtained powder free of a mother liquor with an iron source, and washing and drying; dissolving a treated powder in anhydrous ethanol and conducting an ultrasonic treatment; adding a surfactant to an obtained dispersion, stirring, and conducting the ultrasonic treatment; and conducting coaxial electrospinning and calcination in sequence to obtain the membrane based on a hollow molecular sieve fiber.

8 Claims, 2 Drawing Sheets

PREPARATION METHOD OF EFFICIENT AND STABLE CATALYTIC MEMBRANE BASED ON MULTI-SCALE HOLLOW MOLECULAR SIEVE FIBER

CROSS REFERENCE TO RELATED APPLICATION

This patent application claims the benefit and priority of Chinese Patent Application No. 202210285847.3, filed with the China National Intellectual Property Administration on Mar. 22, 2022, the disclosure of which is incorporated by reference herein in its entirety as part of the present application.

TECHNICAL FIELD

The present disclosure relates to the technical field of molecular sieve preparation, in particular to a preparation method of an efficient and stable catalytic membrane based on a multi-scale hollow molecular sieve fiber.

BACKGROUND

Molecular sieve, as a kind of aluminosilicate with a regular pore structure, is widely used in the fields of catalysis and adsorption due to a high specific surface area, desirable mechanical strength and stability, strong acid resistance, and uniform pore structure (Applied Catalysis A: General. 2011, 398 (1): 1-17.; Micropor Mesopor Mat. 2017, 241: 52-57.). However, most types of molecular sieves have only micropores in their framework structure, with relatively narrow pore distribution. A single type of micropore leads to intragranular diffusion restriction in the molecular sieve, limiting the mass transfer of reactants and products, thereby affecting an activity and selectivity of the molecular sieve (Chem Soc Rev. 2008, 37 (11): 2530-2542.; Catal Sci Technol. 2013, 3 (4): 833-857.). Moreover, the reactants and products diffuse slowly, which are easily deposited on a catalyst surface to block the pores, thus making the catalyst deactivate faster to affect a service life of the catalyst (J Am Chem Soc. 2003, 125 (44): 13370-13371.; Nat Commun 2014, 5 (1): 3922.). To overcome the above shortcomings, researchers have prepared ultrathin molecular sieve nanosheets with a small particle size and a short diffusion path (Science. 2011, 333 (6040): 328-332.), synthesized new molecular sieves with a large pore size (Chem Soc Rev. 2008, 37 (11): 2530-2542.; Catal Sci Technol. 2013, 3 (4): 833-857.), and made modification on the pore size of existing molecular sieves (Chem Soc Rev. 2008, 37 (11): 2530-2542.; Catal Sci Technol. 2013, 3 (4): 833-857.) and the like. Among these methods, multi-scale molecular sieves are prepared by introducing pore structures of different sizes into the molecular sieve structure, which are favored by their accessibility to active sites (including large-sized feedstocks) and enhanced diffusion efficiency (shortened diffusion length). Multi-scale molecular sieves refer to molecular sieves composed of at least two levels of porosity. In addition to the micropores present in common zeolites, mesopores can be prepared by means of template method and the like, while macropores can be generated by macroporous scaffolds. The multi-scale molecular sieves combine the advantages of traditional molecular sieves (with shape selectivity and suitable acidity) and mesoporous-macroporous materials (with fast mass transfer), and have broad prospects for use in the field of catalysis. The hierarchical porosity avoids the carbon deposition of a single microporous channel system, thereby improving a catalytic activity of the zeolite. Researchers generally prepare multi-scale molecular sieves by alkaline leaching (Nat Commun. 2014, 5 (1): 3922.), and the template method (Adv Mater. 2001, 13 (16): 1259-1263.) and other methods, while the hollow molecular sieve is one of the most common multi-scale molecular sieves prepared by the above methods.

In recent years, hollow molecular sieves with the multi-scale pore structure have also attracted people's attention due to a superior performance. However, hollow molecular sieve particles often face the difficult separation after reaction. In addition, the hollow molecular sieve particles are difficult to apply to industrial continuous operation reactions (such as fixed bed reactions). The packed bed of hollow molecular sieve particles has a poor mass transfer and heat transfer, high pressure drop, and irregular fluid distribution, leading to the reduction in selectivity and activity of the molecular sieve catalyst (Chem Commun. 2014, 50 (48): 6343-6345.).

Scholars have researched many different synthetic methods to prepare hollow molecular sieve fibers. Okada et al. successfully prepared a Na—X zeolite-coated fiber on a glass fiber by in situ methods (Micro Meso Mater. 2000, 37, 99.); Valtchev prepared a silicalite-1 zeolite carbon fiber-coated fiber by a seed crystal-membrane growth method, and obtained a silicalite-1 hollow molecular sieve fiber by calcination (Zeolites. 1996, 17, 408.). However, it is difficult to control a thickness of the prepared molecular sieve films and a size of the molecular sieve grains by the above methods, and it is also difficult to avoid simultaneous crystallization of the molecular sieve in a synthesis solution during seed crystal-membrane growth synthesis. Wang et al. assembled a nano-silicalite-1 molecular sieve onto a carbon fiber template by electrophoretic deposition (EPD) and removed the template by roasting, thereby successfully preparing a hollow molecular sieve fiber with pore walls composed of nano-molecular sieves (Chem Lett. 2000, 29 (11): 1344-1345.). However, the method has complicated operations and a high cost.

Over the years, electrospinning has attracted the interest of researchers due to a low cost and a simple device. The electrospinning is a relatively efficient method for preparing nano-scale to micron-sized fibers. In this method, a polymer solution or melt is placed in a high-voltage electrostatic field, and an electric field force acts on charged polymer droplets to stretch the droplets. When the electric field force is strong enough, the polymer droplets overcome their own surface tension to form a jet stream. The solvent in the stream evaporates or solidifies during the jetting, and finally a micron-sized or nano-scale fiber membrane with a nonwoven fabric shape is formed on a receiving device. Currently, researchers mainly prepare the hollow molecular sieve fibers by a fiber template method, including: self-assembling a functional material on a surface of the fiber by electrospinning using the prepared fiber as a template, and removing the core material to obtain the corresponding hollow fiber. However, this method is complicated in operation, including processes such as electrospinning, self-assembly, and template removal.

SUMMARY

In view of the complicated operation and high cost in the existing methods for preparing a membrane based on a hollow molecular sieve fiber, the present disclosure provides a preparation method of an efficient and stable catalytic membrane based on a multi-scale hollow molecular sieve fiber. In the present disclosure, a nano-scale molecular sieve crystal precursor is synthesized, active components are loaded on a molecular sieve by chemical vapor deposition, and coaxial electrospinning is conducted. The diameter of a central macropore can be controlled by changing an injection speed of a spinning solution during the electrospinning. As an active substance, an iron source can be loaded on the molecular sieve to achieve a synergistic effect with the molecular sieve, thereby further improving a catalytic activity of the molecular sieve. The hollow molecular sieve fiber-based catalytic membrane prepared by this method has a multi-scale pore structure, which can exert a strong stability of the molecular sieve and improve a catalytic efficiency of materials. Moreover, the preparation method has simple operation, low cost, and reduced energy consumption, and can be applied to large-scale preparation of the hollow molecular sieve fiber-based membranes.

To achieve the above objective, the present disclosure provides the following technical solutions:

The present disclosure provides a preparation method of an efficient and stable catalytic membrane based on a multi-scale hollow molecular sieve fiber, including the following steps:

(1) mixing a silicon source, an aluminum source, water, and an organic template, conducting complete hydrolysis by stirring, and heating, to obtain a mixed solution I;

(2) supplementing water to the mixed solution I to obtain a mixed solution 11 until a mass of the mixed solution II is the same as a mass of the mixed solution I, and conducting a hydrothermal reaction to obtain a suspension;

(3) conducting centrifugation on the suspension obtained in step (2) at 15,000 rpm to 20,000 rpm and drying an obtained powder I;

(4) mixing a dried powder I obtained in step (3) with an iron source to obtain a mixture, and conducting high-temperature deposition under a nitrogen atmosphere and calcination on the mixture in sequence to obtain a powder II;

(5) dissolving the powder II obtained in step (4) in an organic solvent, and dispersing evenly to obtain a dispersion;

(6) adding a surfactant to the dispersion obtained in step (5), completely dissolving by stirring, and conducting an ultrasonic treatment for 0.5 h to 1 h to obtain a mixed solution;

(7) conducting coaxial electrospinning using the mixed solution obtained in step (6) as an outer solution and paraffin oil as an inner solution to obtain a composite fiber; and (8) conducting calcination on the composite fiber obtained in step (7) to obtain the efficient and stable catalytic membrane based on a multi-scale hollow molecular sieve fiber.

Further, in step (1), the silicon source, the aluminum source, water, and the organic template have a molar ratio of (8-10):(0.2-0.5):(550-650):(20-30); and the heating is conducted at 40° C. to 60° C. for 4 h to 6 h;

the silicon source is tetraethyl silicate, and the aluminum source is aluminum isopropoxide, while other types of silicon sources and aluminum sources cannot well obtain a multi-scale molecular sieve; and the organic template is selected from the group consisting of tetrapropylammonium hydroxide and tetrapropylammonium bromide.

Further, in step (2), the hydrothermal reaction is conducted at 80° C. to 100° C. for 12 h to 24 h.

Further, in step (4), the iron source accounts for 0.5 wt % to 1.0 wt % of the mixture; the iron source is iron acetylacetonate;

the high-temperature deposition is conducted at 300° C. to 400° C. for 1 h to 2 h; and the calcination is conducted at 500° C. to 600° C., with a heating rate of 5° C./min to achieve the above temperature during the calcination.

Further, in step (5), the organic solvent is ethanol.

Further, in step (6), the surfactant is polyvinylpyrrolidone.

Further, in step (7), the coaxial electrospinning is conducted at an inner solution flow rate of 0.4 mL/h to 2.0 mL/h, an outer solution flow rate of 4.0 mL/h to 5.0 mL/h, and a voltage of 18 kV to 25 kV, with a spacing of 20 cm to 40 cm between an aluminum foil receiving plate and a needle tip.

Further, in step (8), the calcination is conducted at 500° C. to 600° C., with a heating rate of 1° C./min to achieve the above temperature during the calcination.

The present disclosure further provides an efficient and stable catalytic membrane based on a multi-scale hollow molecular sieve fiber prepared by the preparation method.

Further, the molecular sieve has a powder type of ZSM-5.

In the present disclosure, the hollow molecular sieve fiber is used as a carrier of the catalyst, which can further improve a mass transfer and diffusion efficiency through a macropore-mesoporous-micropore structure, and an efficient catalytic membrane can be synthesized using the hollow molecular sieve fiber. Compared with traditional bead catalyst carriers, hollow fiber membranes have higher contact efficiency, controllable contact time, less side reactions, and longer service life in a membrane reactor.

In the present disclosure, the hollow fiber is prepared by coaxial electrospinning, where a thinner capillary is inserted into a thicker capillary, the two tubes are kept concentric, and two kinds of immiscible spinning solutions are injected into the inner and outer tubes, respectively, and zero-dimensional or one-dimensional micro-nano materials with a core-shell structure can be obtained under the action of a high-voltage electric field. After the fiber with a core-shell structure is prepared by coaxial electrospinning, the core material can be selectively removed by high-temperature calcination or extraction, and the corresponding membrane with a unique multi-scale structure and based on a hollow molecular sieve fiber can be obtained. The hollow molecular sieve fiber has macroporous hollow channels, and also has an interconnected structure of micropores and mesopores with intrinsic characteristics of the molecular sieve; multiple levels of pore structures are coupled with each other (the mesopores and the micropores have pore volumes of 0.1 $cm^3/g$ to 0.8 $cm^3/g$ and 0.1 $cm^3/g$ to 0.5 $cm^3/g$, respectively), forming a membrane based on a multi-scale hollow molecular sieve fiber, with a three-dimensional network structure (having a porosity reaching 60% to 90%). The membrane can simultaneously exert the advantages of different pore structures and reduce internal and external diffusion resistances of the reaction. The hollow molecular sieve fiber-based membrane has a continuous macrofiber structure, which can easily adjust a porosity of the material and a thickness of the tube wall by controlling a flow rate of the spinning solutions. During the preparation, hollow molecular sieve fiber-based membranes with different properties can be obtained by adjusting and optimizing the parameters, to conduct different types of catalytic reactions as a catalyst carrier with excellent performances. The hollow molecular sieve fiber-based membrane has a multi-scale pore structure, which can reduce the internal and external diffusion resistances of the reactions and improve the catalytic activity, while maintaining a high hydrothermal stability, desirable lipophilicity, and strong chemical corrosion resistance of the molecular sieve material. As a catalyst carrier, the membrane may have an improved catalytic efficiency after loading active components, with a high potential for use in the field of efficient catalysis.

The present disclosure has the following technical effects:

1. In the present disclosure, the hollow molecular sieve fiber-based membrane has a hollow fibrous structure to provide a convenient mass transfer channel for the reactions, and a mesopore-micropore structure to provide a desirable selectivity for the reactions. Compared to traditional bead catalysts, the membrane has higher contact efficiency, controllable contact time, less side reactions, and a longer service life in a membrane reactor.

2. Compared with conventional methods, the coaxial electrospinning has low cost, simple operations, reduced energy consumption, and less reagent usage in preparing the hollow molecular sieve fiber-based membrane, and can be applied to large-scale preparation of the hollow molecular sieve fiber-based membrane.

3. The hollow molecular sieve fiber-based membrane has a multi-scale pore structure, and the hollow molecular sieve fiber-based membrane with graded pore size has a shorter diffusion path, which improves diffusion efficiency and is beneficial to optimization of the stability and selectivity of the catalyst. The membrane combines the advantages of traditional molecular sieves (such as shape selectivity and suitable acidity) and mesoporous-macroporous materials (such as fast mass transfer), thereby expanding an application range of the fiber membrane, with broad prospects for use in the field of catalysis.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

Figure 1:
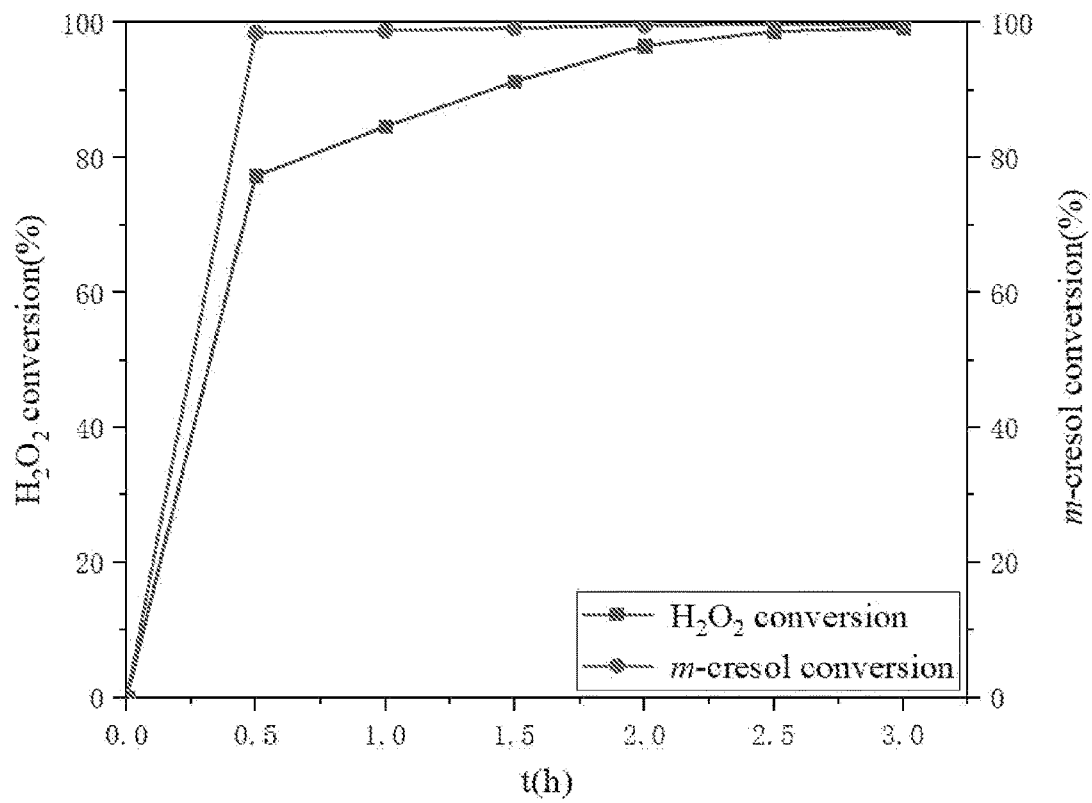
FIG. 1 shows a relation between a reactant conversion rate and a reaction time when using an efficient and stable catalytic membrane based on a multi-scale hollow molecular sieve fiber prepared in Example 1 in a m-cresol catalytic reaction under application conditions.

A plurality of exemplary embodiments of the present disclosure is now described in detail. The detailed description should not be considered as a limitation to the present disclosure, but should be understood as a more detailed description of certain aspects, features, and implement solutions of the present disclosure.

It should be understood that terms described in the present disclosure are merely used to describe specific embodiments and are not intended to limit the present disclosure. In addition, for a numerical range in the present disclosure, it should be understood that each intermediate value between an upper limit and a lower limit of the range is also specifically disclosed. Each smaller range between any stated value or intermediate value in a stated range and any other stated value or intermediate value in the stated range is also included in the present disclosure. The upper and lower limits of these smaller ranges can independently be included or excluded from the range.

Unless otherwise stated, all technical and scientific terms used herein have the same meaning as commonly understood by those of ordinary skill in the art described in the present disclosure. Although the present disclosure describes only preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated documents, the content of this specification shall prevail.

It is obvious to a person skilled in the art that a plurality of modifications and variations can be made to the specific embodiments of the present specification without departing from the scope or spirit of the present disclosure. Other embodiments derived from the description of the present disclosure will be obvious to the skilled person. The specification and examples of the present disclosure are merely exemplary.

As used herein, "including", "having", "containing", and the like are all open-ended terms, which means including but not limited to.

Example 1

A preparation method of an efficient and stable catalytic membrane based on a multi-scale hollow molecular sieve fiber included the following steps:

(1) 52 g of tetraethyl silicate, 1.02 g of aluminum isopropoxide, and 18.27 g of tetrapropylammonium hydroxide were dissolved in 107.82 g of deionized water, and stirred until the above reactants were completely hydrolyzed;

(2) an obtained mixed solution was evaporated by heating for 5 h to remove alcohols produced during the hydrolysis, supplemented with the deionized water until a mass of the mixed solution was the same as an original mass, and a ratio of each substance was kept unchanged before and after;

(3) the mixed solution was reacted at 90° C. for 18 h to obtain a suspension;

(4) the suspension was centrifuged at 20,000 rpm for 30 min to remove a mother liquor, and an obtained powder was washed with the deionized water, where the molecular sieve had a powder type of ZSM-5;

(5) 9.4 g of the powder was mixed with 0.6 g of iron acetylacetonate, and subjected to high-temperature deposition in a nitrogen atmosphere at 310° C. for 1.5 h, and then to calcination at 550° C. for 6 h under vacuum conditions, where the calcination temperature was reached by heating at 5° C./min during the calcination;

(6) 1.6 g of an obtained powder was added into 16.4 g of absolute ethanol, and subjected to ultrasonic treatment until the powder was completely dispersed; the powder was added with 2.0 g of polyvinylpyrrolidone, stirred until completely dissolved, and then subjected to the ultrasonic treatment for 15 min to obtain a mixed solution;

(7) coaxial electrospinning was conducted using the mixed solution as an outer solution at a flow rate of 4.5 mL/h and paraffin oil as an inner solution at a flow rate of 1.0 mL/h under a voltage of 20 kV, with a spacing of 30 cm between an aluminum foil receiving plate and a needle tip; and (8) an obtained electrospun fiber was heated to 550° C. at 1° C./min to conduct calcination for 6 h, so as to obtain the efficient and stable catalytic membrane based on a multi-scale hollow molecular sieve fiber, where the membrane had a mesopore volume and a micropore volume of 0.3 $cm^3/g$ and 0.2 $cm^3/g$, respectively, with a three-dimensional network structure at a porosity reaching 80%.

The efficient and stable catalytic membrane based on a multi-scale hollow molecular sieve fiber prepared in this example was used for wet catalytic oxidation of m-cresol:

The efficient and stable catalytic membrane based on a multi-scale hollow molecular sieve fiber was placed in a reactor at 80'C at a dosage of 2.5 g/L, and hydrogen peroxide was added to conduct the catalytic reaction of m-cresol, where the two reactants had dosages of 6 g/L and 1 g/L, respectively. During the reaction, a stirring rate was 400 rpm, and samples were collected every 30 min during the reaction to measure a conversion rate of the reactants. FIG. 1 showed a relation between a reactant conversion rate and a reaction time when using the efficient and stable catalytic membrane based on a multi-scale hollow molecular sieve fiber in the m-cresol catalytic reaction under application conditions; and during the reaction, a cresol conversion rate reached 99% after 0.5 h.

Example 2

A preparation method of an efficient and stable catalytic membrane based on a multi-scale hollow molecular sieve fiber included the following steps:

(1) 40 g of tetraethyl silicate, 0.8 g of aluminum isopropoxide, and 15 g of tetrapropylammonium hydroxide were dissolved in 85 g of deionized water, and stirred until the above reactants were completely hydrolyzed;

(2) an obtained mixed solution was evaporated by heating for 5 h to remove alcohols produced during the hydrolysis, supplemented with the deionized water until a mass of the mixed solution was the same as an original mass, and a ratio of each substance was kept unchanged before and after;

(3) the mixed solution was reacted at 90° C. for 18 h to obtain a suspension;

(4) the suspension was centrifuged at 20,000 rpm for 30 min to remove a mother liquor, and an obtained powder was washed with the deionized water, where the molecular sieve had a powder type of ZSM-5;

(5) 4.7 g of the powder was mixed with 0.3 g of iron acetylacetonate, and subjected to high-temperature deposition in a nitrogen atmosphere at 310° C. for 1.5 h, and then to calcination at 550° C. for 6 h under vacuum conditions, where the calcination temperature was reached by heating at 5° C./min during the calcination;

(6) 1.2 g of an obtained powder was added into 12.3 g of absolute ethanol, and subjected to ultrasonic treatment until the powder was completely dispersed; the powder was added with 1.5 g of polyvinylpyrrolidone, stirred until the powder was completely dissolved, and then subjected to the ultrasonic treatment for 15 min to obtain a mixed solution;

(7) coaxial electrospinning was conducted using the mixed solution as an outer solution at a flow rate of 4.5 mL/h and paraffin oil as an inner solution at a flow rate of 1.0 mL/h under a voltage of 20 kV, with a spacing of 30 cm between an aluminum foil receiving plate and a needle tip; and (8) an obtained electrospun fiber was heated to 550° C. at 1° C./min to conduct calcination for 6 h, so as to obtain the efficient and stable catalytic membrane based on a multi-scale hollow molecular sieve fiber, where the membrane had a mesopore volume and a micropore volume of 0.6 $cm^3/g$ and 0.1 $cm^3/g$, respectively, with a three-dimensional network structure at a porosity reaching 60%.

Figure 2:
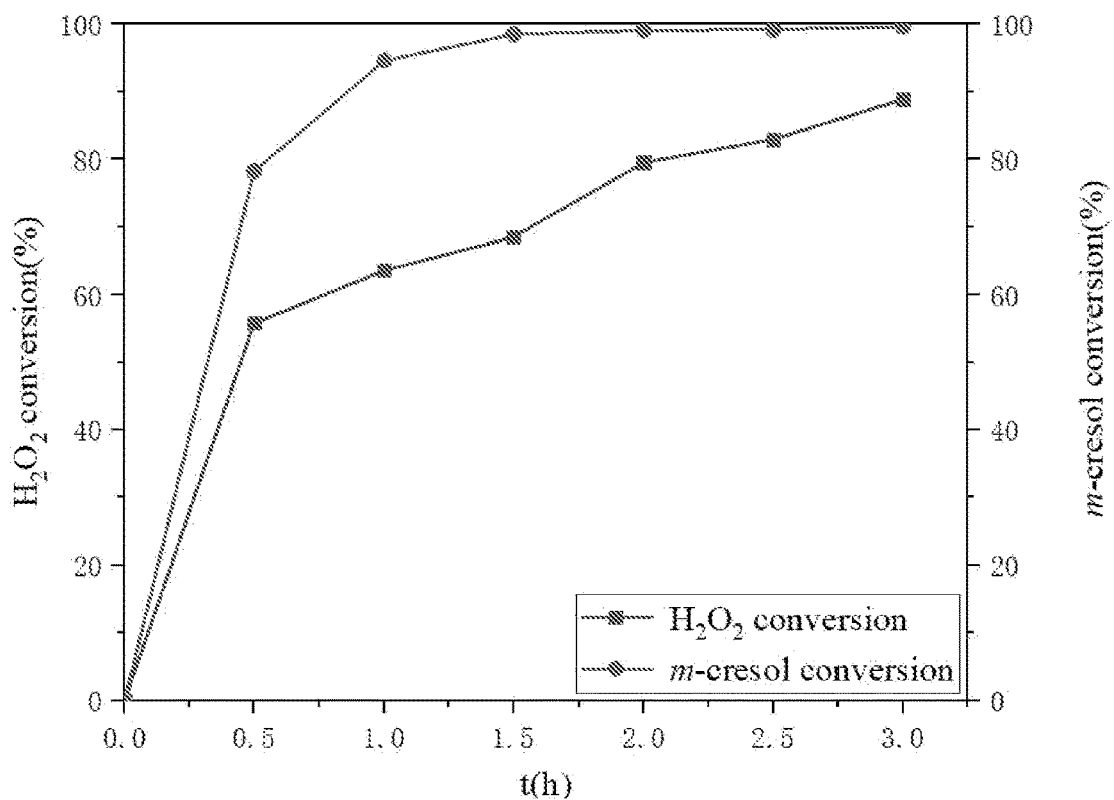
FIG. 2 shows a relation between a reactant conversion rate and a reaction time when using an efficient and stable catalytic membrane based on a multi-scale hollow molecular sieve fiber prepared in Example 2 in a m-cresol catalytic reaction under application conditions.

The efficient and stable catalytic membrane based on a multi-scale hollow molecular sieve fiber prepared in this example was used for wet catalytic oxidation of m-cresol:

The efficient and stable catalytic membrane based on a multi-scale hollow molecular sieve fiber was placed in a reactor at 60° C. at an dosage of 2.5 g/L, and hydrogen peroxide was added to conduct the catalytic reaction of m-cresol, where the two reactants had dosages of 6 g/L and 1 g/L, respectively. During the reaction, a stirring rate was 400 rpm, and samples were collected every 30 min during the reaction to measure a conversion rate of the reactants. FIG. 2 showed a relation between a reactant conversion rate and a reaction time when using the efficient and stable catalytic membrane based on a multi-scale hollow molecular sieve fiber in the m-cresol catalytic reaction under application conditions; and during the reaction, a cresol conversion rate was 99% after 1.5 h.

Example 3

A preparation method of an efficient and stable catalytic membrane based on a multi-scale hollow molecular sieve fiber included the following steps:

(1) 20 g of tetraethyl silicate, 0.5 g of aluminum isopropoxide, and 7.0 g of tetrapropylammonium hydroxide were dissolved in 43.5 g of deionized water, and stirred until the above reactants were completely hydrolyzed;

(2) an obtained mixed solution was evaporated by heating for 5 h to remove alcohols produced during the hydrolysis, supplemented with the deionized water until a mass of the mixed solution was the same as an original mass, and a ratio of each substance was kept unchanged before and after;

(3) the mixed solution was reacted at 90° C. for 18 h to obtain a suspension;

(4) the suspension was centrifuged at 20,000 rpm for 30 min to remove a mother liquor, and an obtained powder was washed with the deionized water, where the molecular sieve had a powder type of ZSM-5;

(5) 2.35 g of the powder was mixed with 0.15 g of iron acetylacetonate, and subjected to high-temperature deposition in a nitrogen atmosphere at 310° C. for 1.5 h, and then to calcination at 550° C. for 6 h under vacuum conditions, where the calcination temperature was reached by heating at 5° C./min during the calcination;

(6) 1.2 g of an obtained powder was added into 12.3 g of absolute ethanol, and subjected to ultrasonic treatment until the powder was completely dispersed; the powder was added with 1.5 g of polyvinylpyrrolidone, stirred until the powder was completely dissolved, and then subjected to the ultrasonic treatment for 15 min to obtain a mixed solution;

(7) coaxial electrospinning was conducted using the mixed solution as an outer solution at a flow rate of 4.5 mL/h and paraffin oil as an inner solution at a flow rate of 2.0 mL/h under a voltage of 22 kV, with a spacing of 30 cm between an aluminum foil receiving plate and a needle tip; and (8) an obtained electrospun fiber was heated to 550° C. at 1° C./min to conduct calcination for 6 h, so as to obtain the efficient and stable catalytic membrane based on a multi-scale hollow molecular sieve fiber, where the membrane had a mesopore volume and a micropore volume of 0.1 cm$^3$/g and 0.15 cm$^3$/g, respectively, with a three-dimensional network structure at a porosity reaching 90%.

Figure 3:
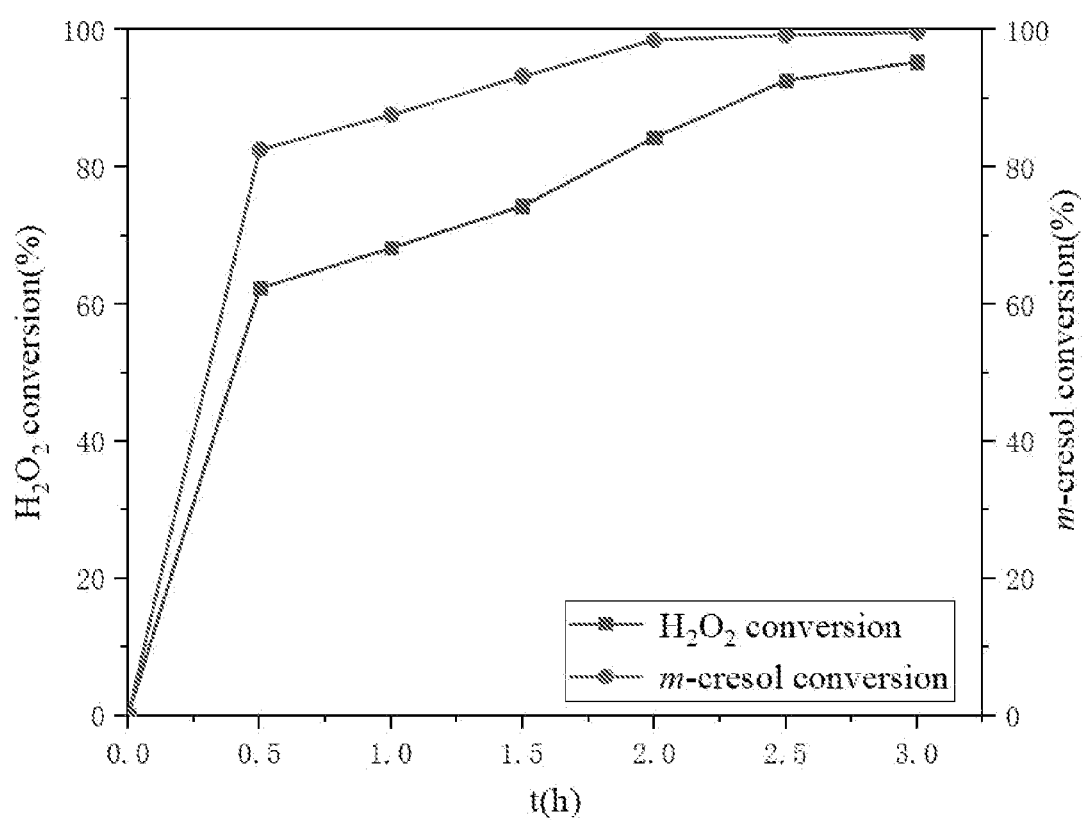
FIG. 3 shows a relation between a reactant conversion rate and a reaction time when using an efficient and stable catalytic membrane based on a multi-scale hollow molecular sieve fiber prepared in Example 3 in a m-cresol catalytic reaction under application conditions.

The efficient and stable catalytic membrane based on a multi-scale hollow molecular sieve fiber prepared in this example was used for wet catalytic oxidation of m-cresol:

The efficient and stable catalytic membrane based on a multi-scale hollow molecular sieve fiber was placed in a reactor at 60° C. at an dosage of 4 g/L, and hydrogen peroxide was added to conduct the catalytic reaction of m-cresol, where the two reactants had dosages of 6 g/L and 1 g/L, respectively. During the reaction, a stirring rate was 400 rpm, and samples were collected every 30 min during the reaction to measure a conversion rate of the reactants. FIG. 3 showed a relation between a reactant conversion rate and a reaction time when using the efficient and stable catalytic membrane based on a multi-scale hollow molecular sieve fiber in the m-cresol catalytic reaction under application conditions; and during the reaction, a cresol conversion rate exceeded 99% after 2 h.

Example 4

A preparation method of an efficient and stable catalytic membrane based on a multi-scale hollow molecular sieve fiber included the following steps:

(1) 17 g of tetraethyl silicate, 0.35 g of aluminum isopropoxide, and 42 g of tetrapropylammonium hydroxide were dissolved in 133 g of deionized water, and stirred until the above reactants were completely hydrolyzed;

(2) an obtained mixed solution was evaporated by heating for 6 h to remove alcohols produced during the hydrolysis, supplemented with the deionized water until a mass of the mixed solution was the same as an original mass, and a ratio of each substance was kept unchanged before and after;

(3) the mixed solution was reacted at 100° C. for 14 h to obtain a suspension;

(4) the suspension was centrifuged at 20,000 rpm for 30 min to remove a mother liquor, and an obtained powder was washed with the deionized water, where the molecular sieve had a powder type of ZSM-5;

(5) 18 g of the powder was mixed with 2 g of iron acetylacetonate, and subjected to high-temperature deposition in a nitrogen atmosphere at 310° C. for 1.5 h, and then to calcination at 600° C. for 6 h under vacuum conditions, where the calcination temperature was reached by heating at 5° C./min during the calcination;

(6) 1.3 g of an obtained powder was added into 10 g of absolute ethanol, and subjected to ultrasonic treatment until the powder was completely dispersed; the powder was added with 1.2 g of polyvinylpyrrolidone, stirred until the powder was completely dissolved, and then subjected to the ultrasonic treatment for 15 min to obtain a mixed solution;

(7) coaxial electrospinning was conducted using the mixed solution as an outer solution at a flow rate of 4.5 mL/h and paraffin oil as an inner solution at a flow rate of 2.0 mL/h under a voltage of 22 kV, with a spacing of 20 cm between an aluminum foil receiving plate and a needle tip; and (8) an obtained electrospun fiber was heated to 550° C. at 1° C./min to conduct calcination for 6 h, so as to obtain the efficient and stable catalytic membrane based on a multi-scale hollow molecular sieve fiber, where the membrane had a mesopore volume and a micropore volume of 0.8 cm$^3$/g and 0.5 cm$^3$/g, respectively, with a three-dimensional network structure at a porosity reaching 80%.

The efficient and stable catalytic membrane based on a multi-scale hollow molecular sieve fiber prepared in this example was used for wet catalytic oxidation of m-cresol:

The efficient and stable catalytic membrane based on a multi-scale hollow molecular sieve fiber was placed in a reactor at 60° C. at an dosage of 2.5 g/L, and hydrogen peroxide was added to conduct the catalytic reaction of m-cresol, where the two reactants had dosages of 6 g/L and 1 g/L, respectively. During the reaction, a stirring rate was 200 rpm, and samples were collected every 30 min during the reaction to measure a conversion rate of the reactants. The efficient and stable catalytic membrane based on a multi-scale hollow molecular sieve fiber was used to conduct a m-cresol catalytic reaction under application conditions; and during the reaction, a cresol conversion rate exceeded 99% after 2 h.

Example 5

A preparation method of an efficient and stable catalytic membrane based on a multi-scale hollow molecular sieve fiber included the following steps:

(1) 30 g of tetraethyl silicate, 0.58 g of aluminum isopropoxide, and 58.5 g of tetrapropylammonium hydroxide were dissolved in 155.5 g of deionized water, and stirred until the above reactants were completely hydrolyzed;

(2) an obtained mixed solution was evaporated by heating for 5 h to remove alcohols produced during the hydrolysis, supplemented with the deionized water until a mass of the mixed solution was the same as an original mass, and a ratio of each substance was kept unchanged before and after;

(3) the mixed solution was reacted at 80'C for 18 h to obtain a suspension;

(4) the suspension was centrifuged at 20,000 rpm for 30 min to remove a mother liquor, and an obtained powder was washed with the deionized water, where the molecular sieve had a powder type of ZSM-5;

(5) 15.84 g of the powder was mixed with 0.16 g of iron acetylacetonate, and subjected to high-temperature deposition in a nitrogen atmosphere at 310° C. for 1.5 h, and then to calcination at 550°C for 6 h under vacuum conditions, where the calcination temperature was reached by heating at 5° C./min during the calcination;

(6) 1 g of an obtained powder was added into 15 g of absolute ethanol, and subjected to ultrasonic treatment until the powder was completely dispersed; the powder was added with 2.0 g of polyvinylpyrrolidone, stirred until the powder was completely dissolved, and then subjected to the ultrasonic treatment for 15 min to obtain a mixed solution;

(7) coaxial electrospinning was conducted using the mixed solution as an outer solution at a flow rate of 4.5 ml/h and paraffin oil as an inner solution at a flow rate of 2.0 m/h under a voltage of 22 kV, with a spacing of 40 cm between an aluminum foil receiving plate and a needle tip; and (8) an obtained electrospun fiber was heated to 550° C. at 1° C./min to conduct calcination for 6 h, so as to obtain the efficient and stable catalytic membrane based on a multi-scale hollow molecular sieve fiber, where the membrane had a mesopore volume and a micropore volume of 0.4 cm$^3$/g and 0.2 cm$^3$/g, respectively, with a three-dimensional network structure at a porosity reaching 80%.

The efficient and stable catalytic membrane based on a multi-scale hollow molecular sieve fiber prepared in this example was used for wet catalytic oxidation of m-cresol:

The efficient and stable catalytic membrane based on a multi-scale hollow molecular sieve fiber was placed in a reactor at 60° C. at an dosage of 2.5 g/L, and hydrogen peroxide was added to conduct the catalytic reaction of m-cresol, where the two reactants had dosages of 6 g/L and 1 g/L, respectively. During the reaction, a stirring rate was 100 rpm, and samples were collected every 30 min during the reaction to measure a conversion rate of the reactants. The efficient and stable catalytic membrane based on a multi-scale hollow molecular sieve fiber was used to conduct a m-cresol catalytic reaction under application conditions; and during the reaction, a cresol conversion rate exceeded 99% after 2 h.

Comparative Example 1

This example was the same as Example 1, the only difference was that: a flow rate of the outer solution for coaxial electrospinning in step (7) was increased to 5.5 mL/h.

Results: compared with Example 1, the hollow molecular sieve fiber-based membrane prepared in this comparative example did not have beads and droplets, but had uneven particle size distribution, thereby weakening a traction force per unit volume of the electrospinning solution and weakening a differentiation ability of the fiber corresponding to unit volume of jet. Therefore, the fiber had an increased diameter, resulting in a greatly reduced catalytic efficiency, with a m-cresol conversion rate less than 80% after 2 h.

Comparative Example 2

This example was the same as Example 1, the only difference was that: a flow rate of the outer solution for coaxial electrospinning in step (7) was reduced to 3.5 mL/h.

Results: compared with Example 1, the hollow molecular sieve fiber-based membrane prepared in this comparative example had uneven fiber thickness, decreased fiber diameter, low mechanical strength, loose structure, and poor reusability, which could not be shaped.

Comparative Example 3

This example was the same as Example 1, the only difference was that: a voltage in step (7) was increased to 25 kV.

Results: compared with Example 1, in the hollow molecular sieve fiber-based membrane prepared in this comparative example, due to an excessive voltage, the differentiated fibers were not fully cured when being attached to the receiving plate, resulting in a certain degree of adhesion, which made the membrane unable to be shaped, with uneven fiber distribution. Moreover, there were many fibers during the spinning, which were continuous but not dispersed, causing turbulence in the jet flow sometimes.

Comparative Example 4

This example was the same as Example 1, the only difference was that: a voltage in step (7) was decreased to 5 kV.

Results: compared with Example 1, the hollow molecular sieve fiber-based membrane prepared in this comparative example had uneven particle size distribution, and it was seen that there were particulate solids on a membrane surface and the membrane has an uneven thickness, resulting in a decreased catalytic efficiency. Moreover, during the spinning, there were hanging droplets from the needle tip, with a serious droplet falling phenomenon.

Comparative Example 5

This example was the same as Example 1, the only difference was that: a spacing was reduced to 20 cm between an aluminum foil receiving plate and a needle tip in step (7).

Results: compared with Example 1, in the hollow molecular sieve fiber-based membrane prepared in this comparative example, there were less fibers with an uneven thickness; due to a low spacing, the spinning jet had a smaller range, and the fibers were entangled with each other and could not be spread out, resulting in the inability to spin normally.

The above examples are only intended to describe the preferred implementations of the present disclosure, but not to limit the scope of the present disclosure. Various alterations and improvements made by those of ordinary skill in the art based on the technical solution of the present disclosure without departing from the design spirit of the present disclosure shall fall within the scope of the appended claims of the present disclosure.

What is claimed is:

1. A preparation method of an efficient and stable catalytic membrane based on a multi-scale hollow molecular sieve fiber, comprising the following steps:
   (a) mixing a silicon source, an aluminum source, water, and an organic template, conducting complete hydrolysis by stirring, and heating, to obtain a mixed solution I, wherein a molar ratio of the silicon source, the aluminum source, the water, and the organic template is in a range of (8-10):(0.2-0.5):(550-650):(20-30), and the heating is conducted at 40° C. to 60° C. for 4 hours to 6 hours;
   (b) supplementing water to the mixed solution I to obtain a mixed solution II until a mass of the mixed solution II is the same as a mass of the mixed solution I, and conducting a hydrothermal reaction to obtain a suspension;

(c) conducting centrifugation on the suspension and drying an obtained powder I;

(d) mixing a dried powder I with an iron source to obtain a mixture, and conducting high-temperature deposition and calcination on the mixture in sequence to obtain a powder II;

(e) dissolving the powder II obtained in step (d) in an organic solvent, and dispersing to obtain a dispersion;

(f) adding a surfactant to the dispersion, dissolving by stirring, and conducting an ultrasonic treatment to obtain a mixed solution;

(g) conducting coaxial electrospinning using the mixed solution obtained in step (f) as an outer solution and paraffin oil as an inner solution to obtain a composite fiber; and (h) conducting calcination on the composite fiber obtained in step (g) to obtain the efficient and stable catalytic membrane based on a multi-scale hollow molecular sieve fiber.

2. The preparation method according to claim 1, wherein in step (a), the organic template is tetrapropylammonium hydroxide.

3. The preparation method according to claim 1, wherein in step (b), the hydrothermal reaction is conducted at 80° C. to 100° C. for 12 hours to 24 hours.

4. The preparation method according to claim 1, wherein in step (d), the iron source accounts for 0.5 wt % to 1.0 wt % of the mixture; the high-temperature deposition is conducted at 300° C. to 400° C. for 1 hour to 2 hours; and the calcination is conducted at 500° C. to 600° C.

5. The preparation method according to claim 1, wherein in step (e), the organic solvent is ethanol.

6. The preparation method according to claim 1, wherein in step (f), the surfactant is polyvinylpyrrolidone.

7. The preparation method according to claim 1, wherein in step (g), the coaxial electrospinning is conducted at an inner solution flow rate of 0.4 mL/hour to 2.0 mL/hour, an outer solution flow rate of 4.0 mL/hour to 5.0 mL/hour, and a voltage of 18 kV to 25 kV, with a spacing of 20 cm to 40 cm between an aluminum foil receiving plate and a needle tip.

8. The preparation method according to claim 1, wherein in step (h), the calcination is conducted at 500° C. to 600° C.

* * * * *